June 26, 1956     C. H. THAYER     2,752,203

GAS LIFT DISENGAGER

Filed Dec. 29, 1950     2 Sheets-Sheet 1

INVENTOR.
CLARENCE H. THAYER

BY *Busser and Harding*

ATTORNEYS

June 26, 1956 C. H. THAYER 2,752,203
GAS LIFT DISENGAGER
Filed Dec. 29, 1950 2 Sheets-Sheet 2

INVENTOR.
CLARENCE H. THAYER
BY Robert O. Spindle
ATTORNEY

United States Patent Office 2,752,203
Patented June 26, 1956

2,752,203

GAS LIFT DISENGAGER

Clarence H. Thayer, Wallingford, Pa., assignor to Sun Oil Company, Philadelphia, Pa., a corporation of New Jersey Application December 29, 1950, Serial No. 203,324

13 Claims. (Cl. 302—59)

This invention relates to the elevation of granular solids by means of lifting gas, and more particularly to the disengaging of granular solids from gas after such elevation.

Numerous industrial processes involve the continuous circulation of granular solids through a process system. Frequently in such processes, granular solids gravitate continuously through a reaction zone or zones and then are continuously elevated by means of a lifting gas from a level below the reaction zone or zones to a level thereabove. Upon reaching the higher level the granular material is disengaged, that is separated, from gas and returned to the reaction zone or zones for gravitation again therethrough. The present invention relates to a novel method and apparatus for effecting such disengaging with a minimum of attrition of granular solids.

So-called moving bed catalytic conversions of hydrocarbon oil are examples of processes wherein granular solids can be elevated from a level below a conversion zone and other reaction zones such as a regeneration zone to a level above the reaction zones by means of a lifting gas, and wherein also it is highly undesirable that the granular solids should undergo excessive attrition.

The present invention provides method and apparatus whereby granular solids are elevated by lifting gas from an engager vessel through a lift conduit or a plurality of lift conduits to a disengager vessel in such fashion that the stream of gas and solids which continuously issues from the top of the lift conduit rises to a relatively short distance above the top of the conduit before reversing direction and falling into the part of the disengager below the top of the lift conduit. In this manner, the present invention provides a lower degree of attrition than can be obtained with prior art method and apparatus.

The invention will now be described with reference to the attached drawing.

Figure 1:
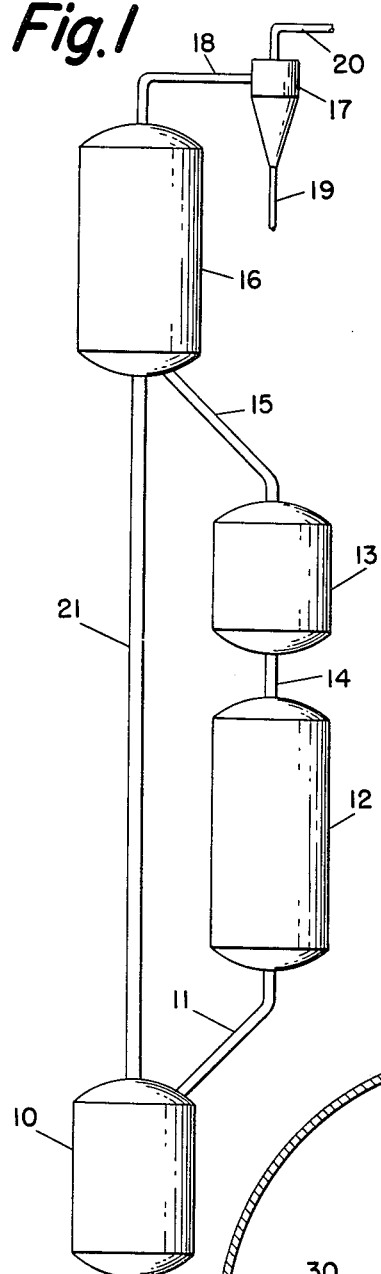
Figure 2:
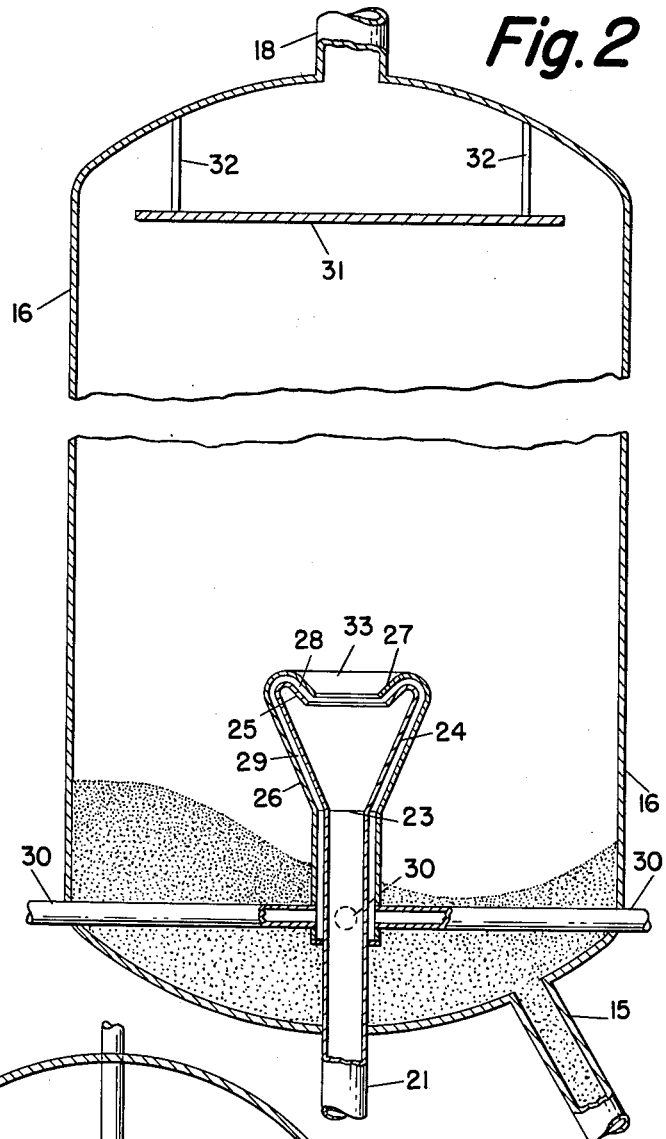
Figure 3:
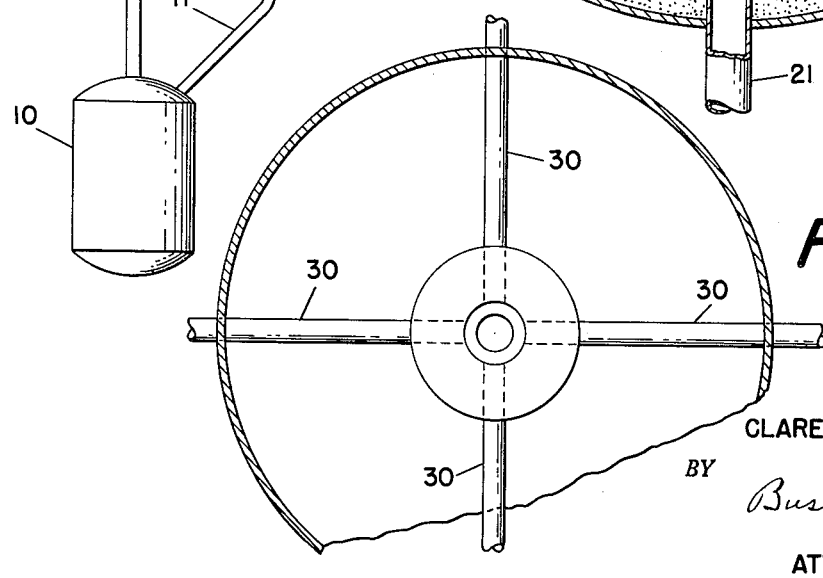
Figure 4:
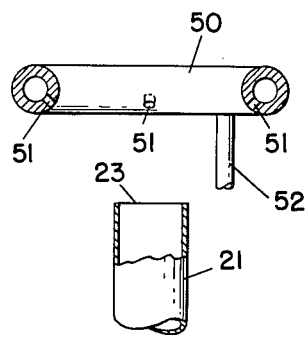
Figure 6:
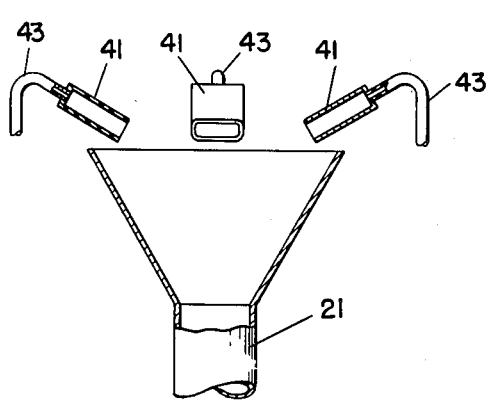
Figure 5:
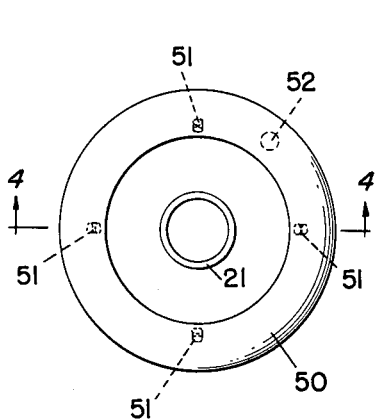
Figure 7:
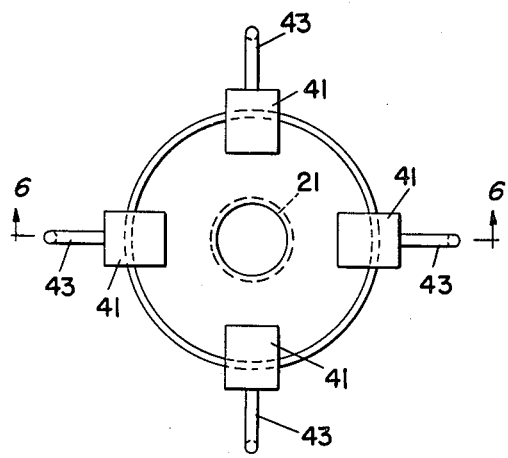

Figure 1 is a diagrammatic view of a process system through which granular solids are continuously circulated, gravitating through reaction zones and being elevated by means of a lifting gas from a level below the reaction zones to a disengaging vessel above the reaction zones. Figure 2 is a sectional elevational view of the disengager. Figure 3 is a sectional plan view of the disengager. Figures 4 and 5 are elevational and plan views respectively of the upper end of the lift conduit, showing different means for discharging braking gas. Figures 6 and 7 are elevational and plan views respectively of the upper end of the lift conduit, showing still different means for discharging braking gas.

Referring to Figure 1, 10 indicates the engager which receives catalyst or contact material by gravity through line 11 from a reaction zone such as a regenerator 12 positioned below an upper reaction zone 13 which receives contact material by gravity continuously through line 15 from a disengager 16. Separating means such as a cyclone separator 17 are in communication with the disengager 16 through line 18 and fines are removed by the separator through line 19 while the lifting medium is removed from the separator 17 through line 20. Conduit 21 elevates granular solids from engager 10 to disengager 16. The lower end of conduit 21 is in communication with engager 10 while the upper end of conduit 21 is in communication with disengager 16. Means are provided adjacent the lower end of conduit 21 to effectively start the lifting operation through the conduit. These can be any suitable means, such as those disclosed in copending application of John F. McKinney, Serial No. 184,601, filed September 13, 1950, now Patent No. 2,744,793, issued May 8, 1956. Figure 1 does not show any details of the present invention and is provided only to show the general arrangement of a system wherein catalyst or contact material is utilized in the form of a continuously moving mass.

Referring now to Figures 2 and 3, which show details of the present invention: the outlet end 23 of lift conduit 21 extends through the lower end of disengager 16 and is positioned a short distance within the lower portion of the disengager. Secured to outlet end 23 of conduit 21 is an inverted frustoconical section 24 having an inwardly turned lip 25. Around the conduit section 24 and an upper portion of lift conduit 21 is a sleeve 26 having an inwardly turned lip 27, which provides with lip 25 an annular passage 28 which is downwardly inclined at an angle of about 45° toward the longitudinal axis of conduit 21. Sleeve 26 provides with conduit section 24 an annular passage 29 which communicates with annular passage 28 and provides a continuous annular passage from a level adjacent the bottom of sleeve 26 to the lower terminus of annular passage 28. Communicating with annular passage 29 are conduits 30 which terminate exteriorly of disengager 16 and are connected to a gas source or sources not shown. Conduits 30 and annular passages 28 and 29 provide a continuous braking gas conduit terminating exteriorly of disengager 16 and extending to the lower terminus of annular passage 28. Baffle plate 31 is secured by hangers 32 to the top of disengager 16, and provides the upper boundary of a space within disengager 16 for substantially unrestricted lateral expansion of gas after issuing from outlet end 23 of lift conduit 21 and from the central passageway 33 provided by the top of sleeve 26. Outlet 18 above baffle plate 31 provides means for withdrawing lifting gas from disengager 16 after the gas has separated from granular solids and passed around and above baffle plate 31.

In operation, lifting gas is introduced into conduit 21 by way of engager 10. Granular solids are introduced into conduit 21 by way of line 11 and engager 10 and are carried suspended in a confined stream of lifting gas moving upwardly through conduit 21. The stream of gas and solids issues from outlet end 23 of conduit 21 into and through conduit section 24 as a central stream. Simultaneously with the above operation, braking gas is introduced through conduits 30 into annular passage 29 and thence into annular passage 28, from which the braking gas is discharged downwardly at an angle into the central stream of lifting gas and solids rising through conduit section 24. The braking gas, upon engaging the central stream or lifting gas and solids, loses its downward velocity through opposition of the central rising stream, commingles with the lifting gas and passes upwardly with the central stream of lifting gas and solids as the latter issues from the central passage 33, which provides an outlet from conduit section 24, into the space within disengager 16 allowing substantially unrestricted lateral expansion of gas. As the stream of gas rises above central passage 33 and laterally expands in the space provided, the solids suspended in the stream lose momentum, and substantially all the solids completely lose their upward velocity before reaching baffle plate 31 and fall back around the central rising stream onto the compact bed of solids gravitating through the receptacle provided by the lower portion of disengager 16. Lifting gas and braking gas separate from solids near baffle plate 31, pass around and above baffle plate 31 and are removed from disengager 16 through outlet 18.

The annular passage 28 in the drawing provides a portion of a braking gas conduit having an outlet positioned inside disengager 16 but outside the space directly above the outlet end 23 of lift conduit 21; i. e., outside the space defined by producing lift conduit vertically upwardly to baffle plate 31. This space is substantially that occupied by the rising stream of lifting gas and solids as it rises above outlet end 23 of lift conduit 21. By positioning the outlet of annular passage 28 outside the space directly above outlet end 23 of lift conduit 21, with the outlet of passage 28 directed downwardly toward that space, means are provided for discharging braking gas from the outlet of annular passage 28 downwardly from outside the rising stream of lifting gas and solids into that rising stream.

Discharging braking gas downwardly into the rising stream according to the present invention has been found to decrease the height of rise of solids above outlet end 23 of lift conduit 21 from the height to which the solids rise in the same apparatus if braking gas is not used. This is demonstrated subsequently in an example.

The inverted frustoconical conduit section 24 shown in the drawing has sides inclined at an angle with the vertical of about 15°, and is generally similar to inverted frustoconical conduit sections as disclosed and claimed in my copending application Serial No. 202,306, filed December 22, 1950, now Patent No. 2,704,228, March 15, 1955, although the latter conduit sections as illustrated in that copending application do not have inwardly turned lips at the tops thereof.

According to the present invention, particularly good results are obtained by using inverted frustoconical conduit sections as disclosed and claimed in the above copending application in combination with the additional features disclosed and claimed herein, but it is to be understood that the use of such conduit sections is not necessary according to the present invention. A necessary feature of the present invention is the provision of a braking gas conduit having an inclined outlet positioned inside the disengaging vessel and outside the space directly above the top of the lift conduit, the outlet being downwardly directed toward the space directly above the top of the lift conduit.

As disclosed in the above identified copending application, an inverted frustoconical conduit section such as that shown in the attached drawing is in itself effective to decrease the height of rise of the rising stream of gas and solids: according to the present invention, a still greater decrease in height of rise is, as subsequently shown in an example, effected by discharging separately introduced braking gas downwardly into the rising stream of gas and solids.

It is to be understood that, instead of the inverted frustoconical conduit section and sleeve, each having an inwardly turned lip at the top thereof, any other suitable structure can be used to provide a gas conduit having an outlet downwardly directed toward the space directly above the outlet end of the lift conduit. Furthermore, the braking gas conduit need not discharge downwardly into an enclosed space such as that provided by conduit section 24 in the drawing. For example, in the absence of conduit section 24 and sleeve 26, a ring conduit could be used, suspended above the outlet end of the lift conduit, the ring conduit having perforations or a slot or slots therein positioned to discharge braking gas from the ring conduit downwardly into the rising stream of gas and solids. Alternatively, the frustoconical sections provided by the lips 25 and 27 shown in the drawing could be used in the absence of conduit section 24 and sleeve 26.

The level at which the outlet of the gas conduit according to the invention is positioned can vary widely. As shown in the drawing, the outlet end of annular passage 28 is positioned about three lift conduit diameters above outlet end 23 of lift conduit 21 and about five-eighths of a lift conduit diameter from the longitudinal axis of the rising stream of lifting gas and solids. This position has been found to generally give a highly advantageous decrease in the height of rise without any pronounced tendency to stall the lift. It is generally preferred that the outlet of the gas conduit should not be more than 10 lift conduit diameters above the outlet end of the lift conduit. The outlet of the gas conduit can according to the invention be positioned much closer to the outlet end of the lift conduit and can even be adjacent the outlet end of the lift conduit, but it must be outside the space directly above the lift conduit, in order that the solids in the rising stream of gas and solids do not strike the gas conduit, and it must be somewhat above the outlet end of the lift conduit in order that the braking gas can be discharged downwardly into the space directly above the outlet end of the lift conduit.

It is generally preferred that the outlet of the gas conduit should not be more than one lift conduit diameter from the periphery of the rising stream of solids, because the effect of the braking gas on the height of rise of solids is greater when the braking gas is discharged from the outlet of the gas conduit at a point within one lift conduit diameter of the periphery of the rising stream. The outlet end of the gas conduit should not be closer to the longitudinal axis of the rising stream than one-half lift conduit diameter; if it were, then it would be positioned within the space directly above the outlet of the gas conduit, and such position is unsuitable for the purposes of the present invention. As the stream of lifting gas and solids rises above the outlet end of the lift conduit, it gradually expands, and the rising solids stream gradually widens. The braking gas conduit used according to the invention should be positioned outside the path of the rising stream of solids; otherwise, impingement of solids upon the braking gas conduit occurs, with resultant attrition of the solids and erosion of the braking gas conduit. The distance between the outlet of the braking gas conduit and the longitudinal axis of the rising stream should therefore, not be less than one-half the diameter of the outlet end of the lift conduit, and if the outlet of the braking gas conduit is at a vertical level at which substantial widening of the solids stream has occurred, the distance should be still greater. In the light of the present specification, a person skilled in the art can determine where to position the outlet of the braking gas conduit so that solids will not impinge thereupon to a substantial degree, and yet so that the outlet is within a short distance, say within one lift conduit diameter of the periphery of the stream of solids rising in the disengager.

According to the present invention, there can be a single outlet to the braking gas conduit, as shown in Figures 2 and 3, with the outlet surrounding the rising stream of gas and solids, or there can be a plurality of outlets spaced around the rising stream, preferably spaced equidistant from each other, or any other suitable arrangement can be used.

According to the invention, the outlet of the braking gas conduit is positioned outside the space directly above the outlet end of the lift conduit and is inclined downwardly toward that space. The outlet of the braking gas conduit must be downwardly inclined: a horizontally directed stream of braking gas has no substantial effect on the height of rise of solids. The angle of inclination can vary widely, but particularly good results are obtained when the outlet of the braking gas conduit is inclined at an angle within the approximate range 30–60° with the vertical so that the braking gas stream is directed downwardly at an angle within the same approximate range.

Referring now to Figures 4 and 5, a ring conduit 50 is positioned above and concentric with the upper end of the lift conduit 21. Apertures 51 in the ring conduit wall are inclined downwardly toward the lift conduit axis and all preferably have the same dimensions. A conduit 52 communicates with ring conduit 51, and is adapted to receive braking gas from a source not shown, external to the disengager.

Ring conduit 50 is positioned within the disengager (not shown in Figures 4 and 5) and is spaced inwardly from the wall thereof, and supported in any suitable manner (supports not shown). Four apertures 51 are illustrated, but any suitable number can be employed. Also, instead of one conduit 52, a plurality of such conduits, adapted to supply braking gas to ring conduit 50, can be employed, spaced around the ring conduit.

In operation, braking gas is passed through line 52 into ring conduit 50 and thence through apertures 51 into contact with the solids stream rising through the central space surrounded by ring conduit 50. The braking gas decelerates the solid particles, which subsequently reverse direction and fall downwardly in the disengager through the space between the outer wall of the ring conduit and the wall of the disengager.

Referring now to Figures 6 and 7, four braking gas conduits 41 are spaced equidistant around the space directly above the outlet 23 of lift conduit 21. An inverted frustoconical baffle is secured to the upper end of the lift conduit. Each conduit 41 has rectangular cross section and is downwardly inclined toward the axis of the lift conduit. A conduit 43 communicates with each braking gas conduit, and is adapted to receive braking gas from a source not shown, external to the disengager; the conduits 43 may be suitably manifolded if desired.

The conduits 41 are positioned within the disengager (not shown in Figures 6 and 7) and are spaced inwardly from the wall thereof, and supported in any suitable manner (supports not shown). Four conduits 41 are illustrated, but any suitable number can be employed.

In operation, braking gas is passed through each conduit 43, preferably at equal rate and velocity for each, and thence through conduits 41 into contact with the solids stream rising through the central space around which conduits 41 are grouped. The braking gas decelerates the solid particles, which subsequently reverse direction and fall downwardly in the disengager through the space between the conduits 41 and the wall of the disengager.

As an example of the manner in which decrease in heights of rise can be obtained according to the invention, the following results are presented of experiments wherein operation in the manner of the present invention, with braking gas blown downwardly at an angle into the rising stream of gas and solids was compared with similar operation in which braking gas was not used. The apparatus used in the experiments consisted of: a disengaging chamber constructed similarly to that shown in Figures 2 and 3; an 8-inch diameter lift conduit having secured to the top thereof an inverted frustoconical conduit section 23 inches high and 20.5 inches in diameter at the top thereof; and four braking gas conduits spaced peripherally equidistant from each other, around the top of the frustoconical conduit section. Each braking gas conduit had approximately rectangular cross-section, about 0.4 inch by 3.1 inches, and was inclined at an angle of 45°. The outlet of each braking gas conduit was about 5 inches from the longitudinal axis of the lift conduit and about 24 inches from the top of the lift conduit, the long dimension of the outlet being horizontal. Each braking gas conduit was connected to a compressed air supply. The four braking gas conduit outlets spaced around the frustoconical conduit section provided a gas outlet like that shown in Figure 2, except that the latter extends continuously around in a complete circle.

Two general types of operation were carried out using the above described apparatus as part of a gas lift system: with no braking gas introduced through the braking gas conduits, and with compressed air introduced through the braking gas conduits at a rate of about 600 cubic feet (standard conditions) per minute, total for the four conduits. Under both general types of operation, a series of runs was made at different lifting gas rates. By plotting for each type of a operation the height of rise of solids above the top of the lift conduit against the lifting gas rate, it was found that at equal lifting gas rates, operation according to the invention gives heights of rise averaging about 6 feet less than the heights of rise obtained with operation without braking gas. For example, at a lifting gas rate of about 1150 cubic feet per minute, the following approximate heights of rise were observed:

|  | feet |
|---|---|
| Operation according to the invention | 3 |
| Operation without braking gas | 9 |

The above heights of rise were maximum heights of rise measured to the top of the rising solids stream and were determined by visual observation through windows in the apparatus.

The decreases in heights of rise obtained by using braking gas as described above were effected without producing any adverse effect on the stability of the lifting operation; no tendency to stall the lift was observed.

The above example shows that use of braking gas decreases the height of rise from that obtained without braking gas with an inverted frustoconical conduit section secured to the top of the lift conduit.

The advantages of decreasing, according to the present invention, the height of rise of solids above the top of the lift conduit are advantages which are important in commercial processes. These advantages are described as followers:

By decreasing the height of rise, one decreases the average distance through which granular solids fall from the top of their rise until their fall is arrested, e. g. by hitting, below the top of the lift conduit, the top of a compact bed of solids gravitating through the lower portion of the disengager. By thus decreasing the distance of fall, one decreases the velocity of the solids at the moment their fall is arrested, and consequently decreases the degree of attrition suffered by the solids upon having their fall abruptly arrested. Since attrition is a phenomenon which must be avoided as much as possible if a process is to be economical, the present invention provides an important advantage by decreasing the degree of attrition.

By decreasing the height of rise, one also decreases the height required in the disengager, because less free space is required above the top of the lift conduit. In any disengager, it is important to have sufficient free space that the solids can reverse direction without having while rising struck any rigid solid obstruction, and the present invention requires less such free space since the solids do not rise as high.

Apparatus and method according to the invention can be used to elevate granular solids generally, but they are particularly advantageously used with particle-form solid catalysts of the pellet or bead variety such as are commonly used in catalytic conversion of hydrocarbon oil. Such catalysts when freshly made are generally particles having major dimensions between, say, $\frac{1}{16}''$ and $\frac{3}{4}''$. Method and apparatus according to the invention are particularly effective to prevent excessive attrition of such catalysts.

The invention claimed is:

1. Method for disengaging granular solids from gas after elevation of granular material suspended in a confined stream of said gas through a substantially vertical confined zone which comprises: discharging gas and granular material from said confined zone into an expansion zone as a rising stream; discharging an inclined stream of separately introduced gas downwardly from outside said rising stream into said rising stream; and passing granular solids upwardly in said expansion zone to a level above the level of discharge of said separately introduced gas.

2. Method according to claim 1 wherein said separately introduced gas is discharged as an annular stream around said rising stream.

3. Method according to claim 1 wherein said separately introduced gas is discharged as a plurality of streams spaced substantially equidistant from each other around said rising stream.

4. Apparatus for pneumatically lifting granular solids and for decelerating solids preparatory to terminating the lifting operation which comprises: an elongated lift conduit having its upper outlet end in communication with a disengaging vessel; and braking gas conduit means downwardly inclined toward the longitudinal axis of said lift conduit and having their lower terminals outside and in gaseous communication with the space for travel of granular solids through and above the upper portion of said lift conduit, said braking gas conduit means being adapted to discharge braking gas from a plurality of positions spaced around said longitudinal axis of said lift conduit.

5. Apparatus for pneumatically lifting granular solids and for decelerating solids preparatory to terminating the lifting operation which comprises: an elongated lift conduit having an upper portion which is expanded relative to the lower portion thereof; a disengaging vessel within which the upper outlet end of said lift conduit is positioned; a conduit section surrounding and spaced apart from said upper portion of said lift conduit and having an inwardly turned lip constituting an inverted frusto-conical conduit section coaxial with said lift conduit and providing the upper surface of an annular inclined braking gas conduit having its lower end outside the space enclosed by the imaginary upward projection of said lower portion of said lift conduit.

6. Apparatus according to claim 4 wherein said braking gas conduit means comprise a plurality of conduits spaced approximately equidistant from each other around said longitudinal axis of said lift conduit.

7. Apparatus according to claim 4 wherein a ring conduit is spaced above the lift conduit outlet and outside said space above the lift conduit outlet, said braking gas conduit means comprising apertures in the inner lower wall of said ring conduit, said apertures being spaced around the longitudinal axis of said lift conduit.

8. Method for disengaging granular solids from gas after elevation of granular material suspended in a confined stream of said gas through a substantially vertical confined zone which comprises: discharging gas and granular material from said confined zone into an expansion zone as a rising stream; and discharging an inclined stream of separately introduced gas downwardly from outside said rising stream into said rising stream; passing granular solids upwardly in said expansion zone to a level above the level of discharge of said separately introduced gas; maintaining the volume rate of discharge of said separately introduced gas less than the volume rate of discharge of the first-named gas from said confined zone into said expansion zone; and maintaining the linear velocity at discharge of said separately introduced gas at a velocity greater than the linear velocity at discharge of said first-named gas.

9. In a system for lifting granular solids by a gas stream wherein a mixture of solids and lift gas is discharged upwardly into a separator vessel at the top of the lift conduit through which said mixture is conveyed, in combination therewith at least one gas inlet conduit associated with said vessel and arranged to supply a blast of gas having a horizontal vector component against said mixture of solids and gas discharged into said vessel.

10. The combination defined in claim 9 wherein said gas inlet conduit is arranged to supply a blast of gas directed downwardly at an angle with the vertical.

11. The combination defined in claim 9 wherein a plurality of gas inlet conduits are associated with said vessel, at least one of which is arranged to supply a blast of gas directed downwardly at an angle with the vertical.

12. A disengager for separating conveyed granular solids from an upwardly directed stream of lift gas discharging from the upper end of a lift pipe comprising a vessel containing the upper end portion of said lift pipe and extending a substantial distance above said upper end, gas outlet means at the upper end of said vessel, solids outlet means at the lower end of said vessel, and means for introducing a stream of deflecting gas into said vessel so directed and in such amount as to intersect the discharging stream of lift gas and solids and to deflect said solids toward a side of said vessel.

13. Apparatus as defined in claim 12 in which said means for introducing deflecting gas comprises means for discharging gas downwardly and transversely with respect to the axis of said lift pipe.

References Cited in the file of this patent

UNITED STATES PATENTS

| 1,391,744 | Lower | Sept. 27, 1921 |
| 1,641,149 | Bernert | Sept. 6, 1927 |
| 1,885,645 | Vawter | Nov. 1, 1932 |
| 2,106,869 | Falkenstein | Feb. 1, 1938 |
| 2,358,497 | Egloff | Sept. 19, 1944 |